United States Patent
Tanaka et al.

(10) Patent No.: US 8,830,511 B2
(45) Date of Patent: Sep. 9, 2014

(54) ENVIRONMENTAL CONTRIBUTION SUPPORTING APPARATUS AND ENVIRONMENTAL CONTRIBUTION SUPPORTING METHOD WITH IMAGES AND MESSAGES ENCOURAGING USAGE OF DUPLEX, N-UP, AND DECOLORIZABLE INK TYPE PRINTING

(75) Inventors: Hiroyo Tanaka, Tokyo (JP); Yoshikatsu Kamisuwa, Tokyo (JP); Tsunehiro Motegi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 253 days.

(21) Appl. No.: 13/531,916

(22) Filed: Jun. 25, 2012

(65) Prior Publication Data

US 2012/0325101 A1  Dec. 27, 2012

Related U.S. Application Data

(60) Provisional application No. 61/501,442, filed on Jun. 27, 2011.

(51) Int. Cl.
*G06F 3/12* (2006.01)
*H04N 1/60* (2006.01)
*G03F 3/10* (2006.01)
*B41J 2/325* (2006.01)

(52) U.S. Cl.
USPC ............ 358/1.15; 358/527; 358/1.9; 347/179

(58) Field of Classification Search
USPC .......................... 358/1.15, 527, 1.9; 347/179
See application file for complete search history.

(56) References Cited

U.S. PATENT DOCUMENTS

| | | | |
|---|---|---|---|
| 6,375,742 B2* | 4/2002 | Sano et al. .................... | 118/600 |
| 7,499,655 B2 | 3/2009 | Yamauchi et al. | |
| 2008/0008508 A1* | 1/2008 | Mizobuchi et al. .......... | 399/389 |
| 2011/0222130 A1* | 9/2011 | Iguchi et al. .................. | 358/452 |
| 2011/0235075 A1* | 9/2011 | Iguchi et al. .................. | 358/1.12 |
| 2011/0236843 A1* | 9/2011 | Iguchi et al. .................... | 432/32 |
| 2012/0033250 A1* | 2/2012 | Grasso et al. ................ | 358/1.15 |
| 2012/0327487 A1* | 12/2012 | Kamisuwa et al. .......... | 358/527 |
| 2013/0016376 A1* | 1/2013 | Hashidume et al. .......... | 358/1.9 |

FOREIGN PATENT DOCUMENTS

| | | |
|---|---|---|
| JP | 2005-088506 | 4/2005 |
| JP | 2010-134765 | 6/2010 |
| JP | 2010134765 A * | 6/2010 |

* cited by examiner

*Primary Examiner* — Houshang Safaipour
*Assistant Examiner* — Walter Yehl
(74) *Attorney, Agent, or Firm* — Amin, Turocy & Watson, LLP

(57) ABSTRACT

According to one embodiment, an environmental contribution supporting apparatus provided for a system including a printing apparatus and an erasing apparatus includes a duplex-reduction calculating unit, an aggregation-reduction calculating unit, a sheet-reduction-ratio calculating unit, a printing-state-character selecting unit, a sheet-reuse-ratio calculating unit, a reuse-state-character selecting unit, a sheet-reduction-message selecting unit, a sheet-reuse-message selecting unit, an advice setting unit, and a report creating unit configured to edit a character selected by the printing-state-character selecting unit, a character selected by the reuse-state-character selecting unit, and a message set by the advice setting unit into a predetermined form.

14 Claims, 20 Drawing Sheets

FIG.2

| No. | SERIAL NUMBER | USER ID | START DATE AND TIME | END DATE AND TIME | FUNCTION | COLOR | SIZE | DUPLEX SETTING | AGGREGATION | INPUT SURFACES | PRINTED SHEETS | PRINTED SURFACES |
|---|---|---|---|---|---|---|---|---|---|---|---|---|
| 1 | AAA1234 | 12345 | 2011/4/1 09:05 | 2011/4/1 09:06 | Print | Full color | A4 | Simplex | 1 | - | 1 | 1 |
| 2 | AAA1234 | 32158 | 2011/4/1 09:10 | 2011/4/1 09:12 | Copy | Black | A4 | Simplex | 1 | 3 | 3 | 3 |
| 3 | BBB5678 | 25347 | 2011/4/1 09:30 | 2011/4/1 09:31 | Print | Black | A3 | Simplex | 2 | - | 4 | 4 |
| 4 | BBB5678 | 45215 | 2011/4/1 09:42 | 2011/4/1 09:45 | Print | Black | A4 | Duplex | 4 | - | 1 | 2 |
| 5 | AAA1234 | 25871 | 2011/4/1 09:55 | 2011/4/1 09:56 | Scan | Full color | - | - | - | 5 | - | - |
| 6 | AAA1234 | 56954 | 2011/4/1 10:02 | 2011/4/1 10:08 | Print | Full color | A4 | Duplex | 1 | - | 6 | 9 |
| 7 | AAA1234 | 15236 | 2011/4/1 10:10 | 2011/4/1 10:13 | Print | Full color | A4 | Simplex | 1 | - | 5 | 5 |
| 8 | BBB5678 | 84576 | 2011/4/1 10:14 | 2011/4/1 10:20 | Print | Black | A4 | Simplex | 2 | - | 24 | 24 |
| 9 | AAA1234 | 53548 | 2011/4/1 10:35 | 2011/4/1 10:38 | Copy | Black | A4 | Duplex | 1 | 2 | 1 | 2 |
| 10 | | | | | | | | | | | | |
| ⋮ | | | | | | | | | | | | |

FIG.3

| No. | SERIAL NUMBER | USER ID | START DATE AND TIME | END DATE AND TIME | SIZE | SET SHEETS | REUSED SHEETS | UNERASED SHEETS | BENT/TORN SHEETS | SHEETS WITH RESIDUALS | OTHER SHEETS |
|---|---|---|---|---|---|---|---|---|---|---|---|
| 1 | XXX1001 | 12345 | 2011/4/10 09:10 | 2011/4/10 09:11 | A4 | 2 | 1 | 1 | 0 | 0 | 0 |
| 2 | XXX1001 | 32158 | 2011/4/21 09:15 | 2011/4/21 09:15 | A4 | 1 | 1 | 0 | 0 | 0 | 0 |
| 3 | XXX1001 | 25871 | 2011/4/22 15:55 | 2011/4/22 15:58 | A4 | 21 | 21 | 0 | 0 | 0 | 0 |
| 4 | XXX1001 | 56954 | 2011/4/25 13:01 | 2011/4/25 13:08 | A4 | 62 | 57 | 3 | 2 | 0 | 0 |
| 5 | XXX1001 | 15236 | 2011/4/25 13:22 | 2011/4/25 13:30 | A4 | 53 | 51 | 2 | 0 | 0 | 0 |
| 6 | XXX1001 | 53548 | 2011/5/12 08:05 | 2011/5/12 08:12 | A4 | 40 | 40 | 0 | 0 | 0 | 0 |
| 7 | | | | | | | | | | | |
| ⋮ | | | | | | | | | | | |

FIG. 4

| SHEET SIZE | A4 CONVERSION COEFFICIENT |
|---|---|
| A3 | 2 |
| A4 | 1 |
| A5 | 0.5 |
| A6 | 0.25 |
| B4 | 1.5 |
| B5 | 0.75 |
| LEDGER | 1.9 |
| LETTER | 1 |
| LEGAL | 1.2 |

ENVIRONMENTAL CONTRIBUTION SUPPORTING APPARATUS AND ENVIRONMENTAL CONTRIBUTION SUPPORTING METHOD WITH IMAGES AND MESSAGES ENCOURAGING USAGE OF DUPLEX, N-UP, AND DECOLORIZABLE INK TYPE PRINTING

CROSS-REFERENCE TO RELATED APPLICATION

This application is based upon and claims the benefit of U.S. Provisional Application No. 61/501,442, filed on Jun. 27, 2011.

FIELD

Embodiments described herein relate generally to an environmental contribution supporting apparatus and an environmental contribution supporting method in a printing environment.

BACKGROUND

In recent years, a printing mode of an image forming apparatus is set to duplex printing or aggregation printing to reduce a used amount of recording sheets and realize a reduction in environmental load during printing. An image forming apparatus is also known that outputs an environmental report in order to improve environment consciousness of a user. Further, a reproducing apparatus is known that applies heating treatment to a sheet having an image formed thereon with a decolorable coloring agent to decolor the image on the sheet and allow the sheet to be reused.

However, the environmental report in the past is merely a report in which an actual result of the number of reduced sheets at a point of issuance of the report is aggregated. It is difficult for a user to maintain motivation for a reduction in environmental loads over a long period. In addition, the environmental report does not advice, in a timely manner, what kind of operation the user should specifically perform in order to reduce environmental loads. Further, there is no environmental report that comprehensively presents a reduction in the number of printed sheets and a reduction in environmental loads through reuse of sheets.

DESCRIPTION OF THE DRAWINGS

FIG. 2 is a table of printing log data according to the first embodiment;

FIG. 3 is a table of erasing log data according to the first embodiment;

FIG. 4 is an A4 size conversion table for sheet sizes according to the first embodiment;

DETAILED DESCRIPTION

In general, according to one embodiment, an environmental contribution supporting apparatus provided for a system including a printing apparatus and an erasing apparatus includes a duplex-reduction calculating unit, an aggregation-reduction calculating unit, a sheet-reduction-ratio calculating unit, a printing-state-character selecting unit, a sheet-reuse-ratio calculating unit, a reuse-state-character selecting unit, a sheet-reduction-message selecting unit, a sheet-reuse-message selecting unit, an advice setting unit, and a report creating unit configured to edit a character selected by the printing-state-character selecting unit, a character selected by the reuse-state-character selecting unit, and a message set by the advice setting unit into a predetermined form.

[Embodiments]

First Embodiment

Embodiments are explained below with reference to the accompanying drawings.

Figure 1:
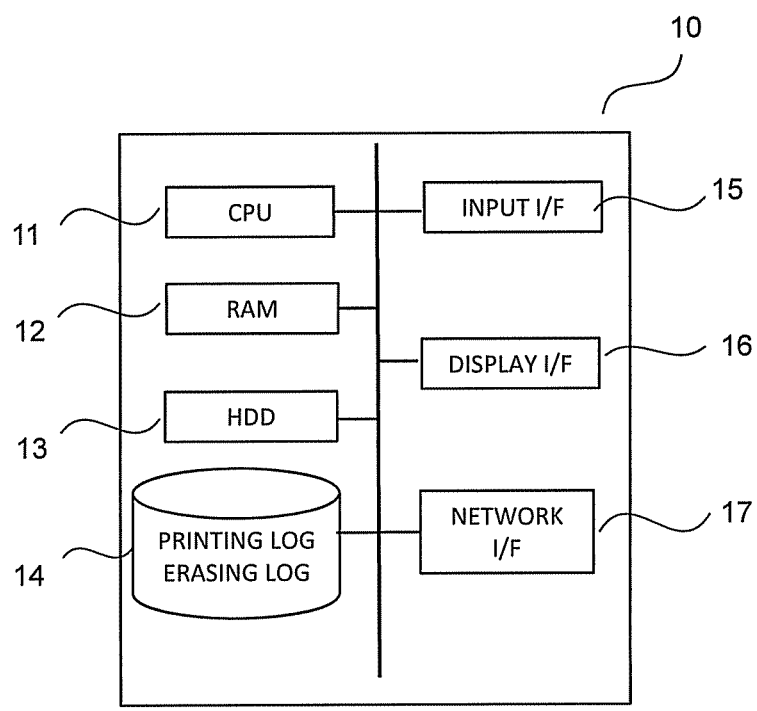
FIG. 1 is a block diagram of the configuration of an environmental contribution supporting apparatus according to a first embodiment.

FIG. 1 is a block diagram of a server included in an environmental contribution supporting apparatus according to a first embodiment. A server 10 includes a CPU (Central Processing Unit) 11, a RAM (Random Access Memory) 12, a HDD (Hard Disc Drive) 13, a log database 14, an input I/F 15, a display I/F 16, and a network I/F 17. The CPU 11 executes a computer program stored in the HDD 13 in cooperation with the RAM 12 to realize a function related to environmental contribution support. The HDD 13 further stores a conversion table for converting respective sheet sizes for printing into an A4 size shown in FIG. 4. The log database 14 saves a printing log shown in FIG. 2 and an erasing log shown in FIG. 3. The CPU 11 periodically collects data concerning a printing state from a not-shown MFP (Multi-Function Peripheral) via the network I/F 17 and accumulates the data in the log database 14 as the printing log. The CPU 11 further periodically collects data concerning an erasing state from a not-shown erasing apparatus via the network I/F 17 and accumulates the data in the log database 14 as the erasing log. The erasing apparatus is a reproducing apparatus that applies heating treatment to a sheet having an image formed thereon with a decolorable coloring agent to decolor the image on the sheet and allow the sheet to be reused. The input I/F 15 is an interface with a not-shown input device such as a keyboard or a mouse. The input I/F 15 receives various data and commands. The display I/F 16 is an interface with a not-shown display. The display I/F 16 outputs display data such as an ecological report explained below. The network I/F 17 is an interface that connects the server 10 to a not-shown wired or wireless LAN.

FIG. 2 is a table of printing log data according to the first embodiment. A printing log is a log obtained by aggregating job data periodically collected from plural MFPs connected via a network. Items collected as the printing log include "serial number" indicating a machine body of an MFP, "user ID" for identifying a user of the MFP, "start date and time" and "end date and time" indicating job execution time, "function" indicating copy, print, and scan as a type of an executed job, "color" indicating a printing color, "size" indicating a size of a sheet used for printing, "duplex setting" indicating whether printing setting is simplex or duplex, "aggregation setting" indicating how many sheets are aggregated in one sheet, "number of input surfaces" for counting the front surfaces and the rear surfaces of original documents, "number of printed sheets" indicating the number of sheets, and "number of printed surfaces" for counting the front surfaces and the rear surfaces of printed sheets. The respective data are acquired for each job and saved in a table format.

For example, a printing log No. 2 indicates that, in an MFP having a machine body number "AAA1234", a user having a user ID "32158" executed "copy" from "Apr. 1, 2011, 9:10" to "Apr. 1, 2011, 9:12". As job contents of the copy, the printing log indicates that an original document having the number of original document surfaces "3" was set to "black", "A4", "simplex", and the number of aggregated sheets "1-in-1", the printed number of sheets was set to "3" as a copy output, and the number of surfaces was "3".

FIG. 3 is a table indicating erasing log data according to this embodiment. An erasing log is a log obtained by aggregating data concerning erasing periodically collected from plural erasing apparatuses. Items collected as the erasing log includes "serial number" indicating a machine body of an erasing apparatus, "user ID" for identifying a user, "start date and time" and "end date and time" indicating erasing processing execution time, "size" indicating a size of a sheet subjected to erasing processing, "the number of set sheets" indicating the number of sheets set in the erasing apparatus, "the number of reused sheets" indicating the number of sheets for which erasing is successful as a result of the erasing processing, and the numbers of rejected sheets including "number of unerased sheets", "number of bent/torn sheets", "number of sheets with residues", and "the number of other sheets" indicating causes of failure in erasing.

For example, an erasing log No. 4 indicates that, in an erasing apparatus having a machine body number "XXX1001", a user having a user ID "56954" set sixty-two "A4" sheets in the erasing apparatus and executed erasing processing from "Apr. 25, 2011, 13:01" to "Apr. 25, 2011, 13:08" and, as a result of the execution of the erasing processing, erasing was successful for "fifty-seven sheets", "three sheets" were rejected because of unerasure, and "two sheets" were rejected because of bends or tears.

FIG. 4 is an A4 size conversion table for sheet sizes according to this embodiment. Conversion values for respective sheet sizes are tabulated with a value for an A4 size sheet set to "1". A conversion value for A3 is "2" and a conversion value for A5 is "0.5". The table includes conversion values for a LEDGER size, a LETTER size, and a LEGAL size. The conversion values are respectively "1.9", "1", and "1.2".

Figure 5:
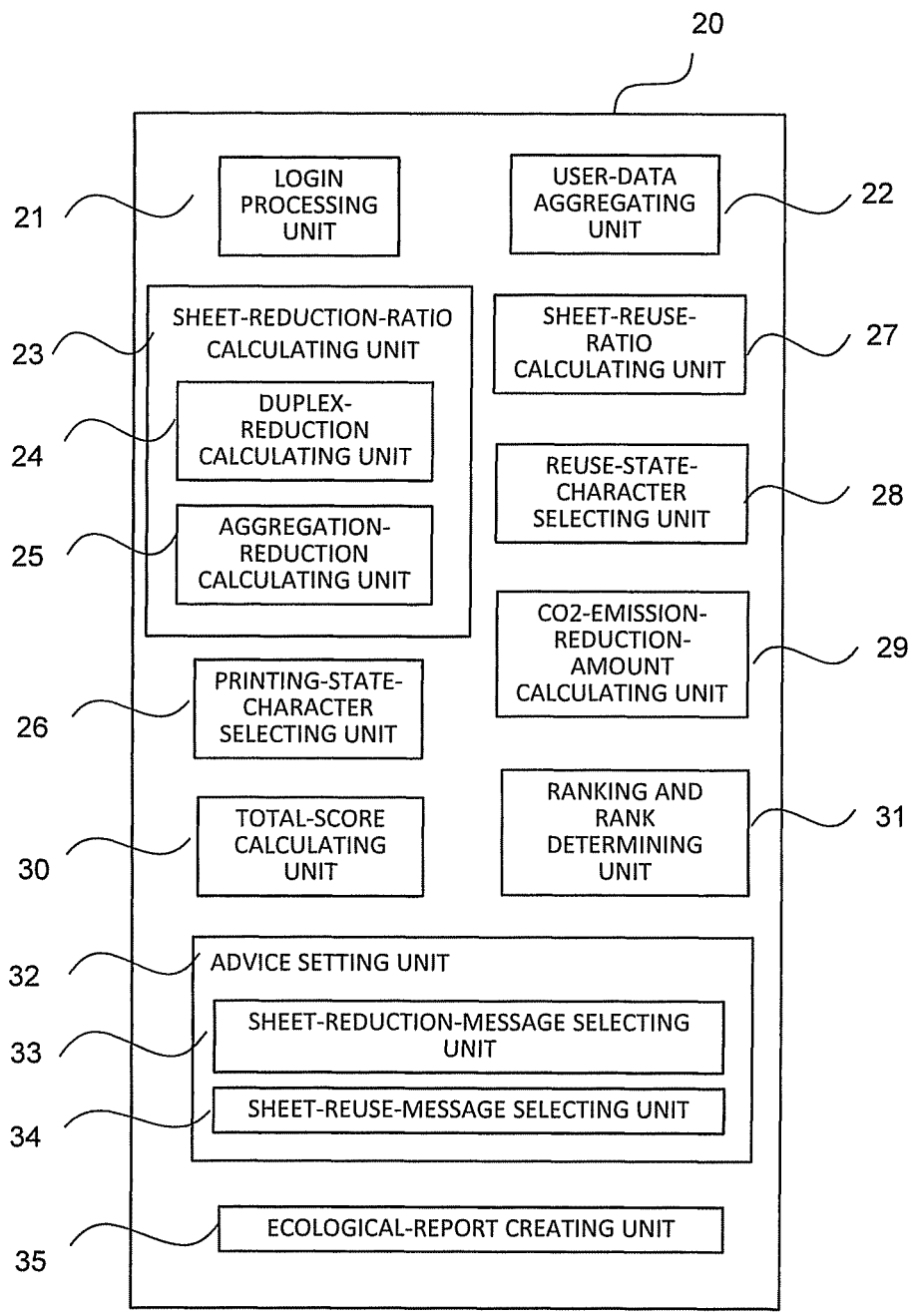
FIG. 5 is a functional block diagram of the environmental contribution supporting apparatus according to the first embodiment.

FIG. 5 is a functional block diagram of the environmental contribution supporting apparatus according to the first embodiment. In this embodiment, a sheet reduction ratio and a sheet reuse ratio are calculated and an ecological report explained below is created on the basis of the printing log and the erasing log saved in the log database 14.

A login processing unit 21 applies authentication to a user ID input from a not-shown keyboard via the input I/F 15 or input from a not-shown MFP or erasing apparatus via the network I/F 17 and, if the authentication is successful, saves the user ID in the RAM 12 as valid identification information. A user-data aggregating unit 22 aggregates jobs executed by a user. The user-data aggregating unit 22 collects, with the user ID saved in the RAM 12 as a key, log data coinciding with the user ID from the printing log and saves the log data in the RAM 12. At the same time, the user-data aggregating unit 22 collects log data coinciding with the user ID from the erasing log and saves the log data in the RAM 12. Log data to be collected is data of jobs executed in a period designated in advance, for example, one day, one week, or one month.

A sheet-reduction-ratio calculating unit 23 includes a duplex-reduction calculating unit 24 and an aggregation-reduction calculating unit 25. The duplex-reduction calculating unit 24 calculates a ratio of the number of sheets reduced by duplex setting. The aggregation-reduction calculating unit 25 calculates a ratio of the number of sheets reduced by aggregation setting (N-in-1). The sheet-reduction-ratio calculating unit 23 calculates an overall sheet reduction ratio from the numbers of reduced sheets respectively calculated by the duplex-reduction calculating unit 24 and the aggregation-reduction calculating unit 25 and calculates an emission reduction amount in terms of $CO_2$.

A printing-state-character selecting unit 26 selects, according to the sheet reduction ratio calculated by the sheet-reduction-ratio calculating unit 23, one of characters of printing states in three stages explained below.

A sheet-reuse-ratio calculating unit 27 calculates a sheet reuse ratio and calculates an emission reduction amount in terms of $CO_2$ from the number of reused sheets.

A reuse-state-character selecting unit 28 selects, according to the sheet reuse ratio calculated by the sheet-reuse-ratio calculating unit 27, one of characters of reuse states in three stages explained below.

A $CO_2$-emission-reduction-amount calculating unit 29 calculates an overall $CO_2$ emission reduction amount from the $CO_2$ emission reduction amount calculated from the number of reduced sheets and the $CO_2$ emission reduction amounts calculated from the number of reused sheets.

A total-score calculating unit 30 calculates a total score on the basis of the number of reduced sheets by duplex calculated by the duplex-reduction calculating unit 24, the number of reduced sheets by aggregation calculated by the aggregation-reduction calculating unit 25, and the number of reused sheets calculated by the sheet-reuse-ratio calculating unit 27. A ranking and rank determining unit 31 calculates ranking from the total score calculated by the total-score calculating unit 30 and displays, as a character, whether the present ranking is up from the last ranking, the same as the last ranking, or down from the last ranking.

An advice setting unit 32 includes a sheet-reduction-message selecting unit 33 and a sheet-reuse-message selecting unit 34. The sheet-reduction-message selecting unit 33 selects a message concerning sheet reduction. The sheet-reuse-message selecting unit 34 selects a message concerning sheet reuse.

An ecological-report creating unit 35 arranges data and characters concerning a printing state and a reuse state for a login user as one report and creates an ecological report explained below.

Figure 6:
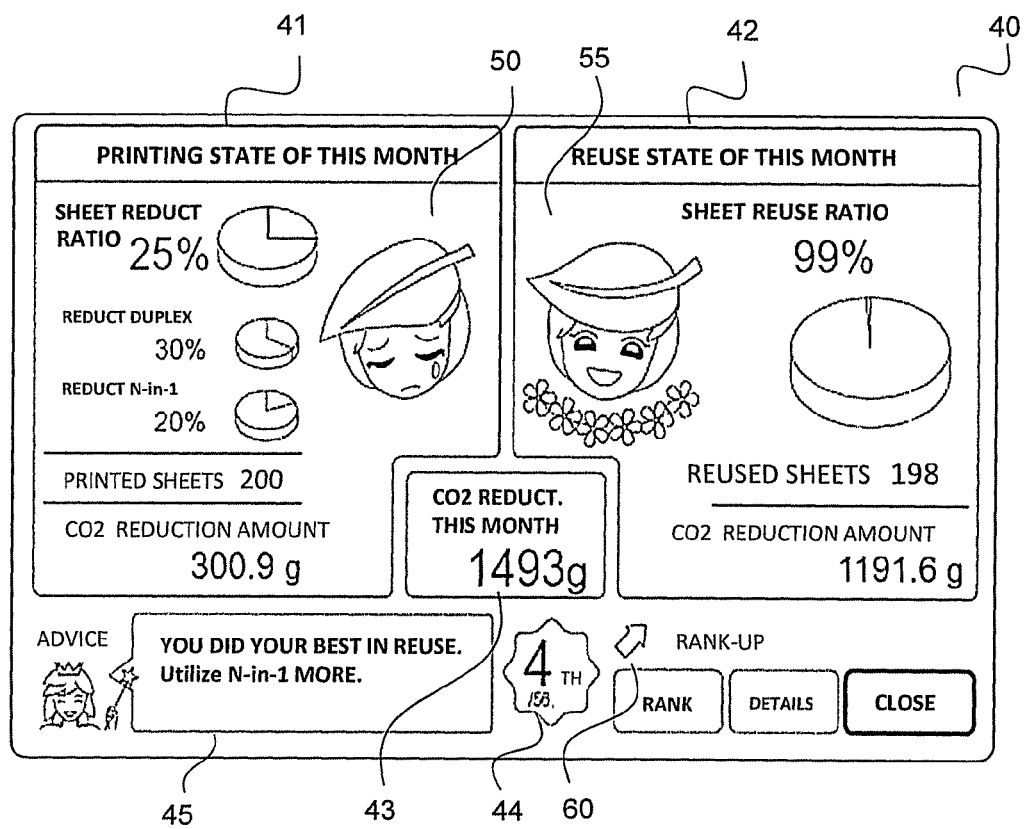
FIG. 6 is a display example of an ecological report according to the first embodiment.

FIG. 6 is a display example of an ecological report according to the first embodiment. An ecological report 40 is a report output to a user logging in to a system. When a user logs in to a not-shown MFP or erasing apparatus connected via the network I/F 17 of the server 10, the ecological report 40 is displayed on a display screen of the apparatus. The ecological report 40 may be displayed on a not-shown client PC connected via the network I/F 17 in response to a request from a user of the PC. The ecological report 40 may be transmitted to the user as an attachment file of an electronic mail in a form of an image file. Further, the ecological report 40 may be printed on a recording medium by a predetermined printing apparatus according to a printing instruction of the user.

The ecological report 40 includes a printing state area 41 in which a printing state in a predetermined period, one month in this embodiment, i.e., a printing state in this month in this example is displayed, a reuse state area 42 in which a sheet reuse state in one month in this embodiment, i.e., a reuse state of this month in this example is displayed, a CO2 emission reduction amount display area 43 in which a CO2 emission reduction amount in one month in this embodiment, i.e., a CO2 emission reduction amount of this month is displayed on the basis of both the printing state and the reuse state, a rank display area 44, and an advice display area 45 in which a comprehensive advice is provided concerning the present ecological state from the printing state and the reuse state. In the printing state area 41, a character 50 corresponding to the printing state is displayed. In the reuse state area 42, a character 55 corresponding to the reuse state is displayed. The characters 50 and 55 are explained in detail below. In the rank display area 44, a rank state character 60 indicating whether the present ranking is up from the last ranking, the same as the last ranking, or down from the last ranking is displayed. The character 60 is explained in detail below.

In the printing state area 41, a sheet reduction ratio, a reduction ratio by duplex, and a reduction ratio by N-in-1 (also expressed as aggregation) respectively as numerical values and graphs. In the printing state area 41, the number of reduced printed sheets and a CO2 emission reduction amount in terms of the number of reduced sheets are further displayed. In the reuse state area 42, a reduction ratio of reused sheets is displayed as a numerical value and a graph. In the reuse state area 42, the number of reused sheets and a CO2 emission reduction amount in terms of the number of reused sheets are further displayed.

Figure 7:
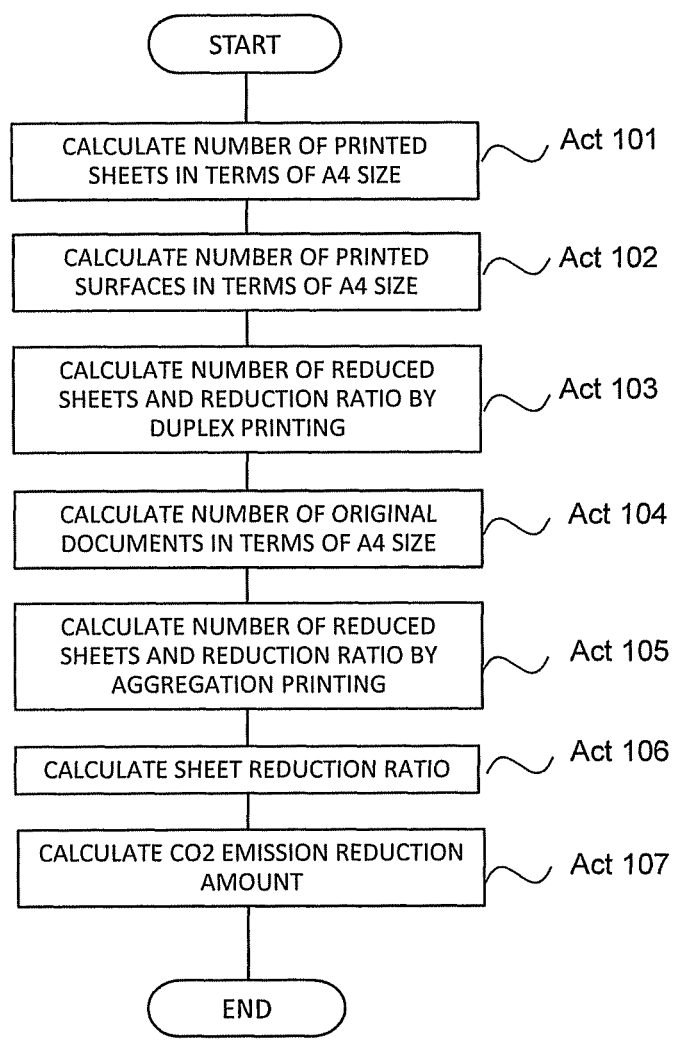
FIG. 7 is a flowchart for explaining processing for calculating a reduction ratio of sheets according to the first embodiment.

FIG. 7 is a flowchart for explaining processing for calculating a sheet reduction ratio according to the first embodiment.

The sheet-reduction-ratio calculating unit 23 acquires a sheet size from size information of a printing log aggregated for each login user and acquires an A4 conversion coefficient ($A_{size}$) corresponding to the sheet size from the A4 conversion table shown in FIG. 4. When the number of printed sheets per one job is represented as (x1), a sum (y1) of the numbers of printed sheets is calculated as $y1=\Sigma(A_{size} \times x1)$ (Act 101).

The duplex-reduction calculating unit 24 calculates a reduction ratio by duplex printing. The reduction ratio by duplex printing indicates a ratio of the number of sheets reduced by duplex printing setting. First, the duplex-reduction calculating unit 24 calculates the number of sheet surfaces in terms of A4. As in the calculation of the number of printed sheets, the duplex-reduction calculating unit 24 acquires a sheet size from the size information of the printing log and acquires the A4 conversion coefficient ($A_{size}$) corresponding to the sheet size from the A4 conversion table shown in FIG. 4. When the number of printed surfaces per one job is represented as (x2), a sum (y2) of the numbers of printed surfaces is calculated as $y2=\Sigma(A_{size} \times x2)$ (Act 102).

The number of reduced sheets by duplex ($z_{duplex}$) is a sum of values obtained by multiplying, with the A4 conversion coefficient ($A_{size}$), a value obtained by subtracting the number of printed sheets (x1) per one job from the number of printed surfaces (x2) per one job. The number of reduced sheets by duplex ($z_{duplex}$) is calculated as $z_{duplex}=\Sigma(A_{size} \times (x2-x1))$. The reduction ratio by duplex ($r_{duplex}$) is a value obtained by dividing the number of reduced sheets by duplex ($z_{duplex}$) by the number of printed surfaces (y2). Therefore, the reduction ratio by duplex ($r_{duplex}$) can be calculated as $r_{duplex}=z_{duplex} \div y2$ (Act 103).

The aggregation-reduction calculating unit 25 calculates a reduction ratio by aggregation (N-in-1) printing. The reduction ratio by aggregation indicates a ratio of the number of sheets reduced by aggregation setting. First, the aggregation-reduction calculating unit 25 calculates the number of original documents in terms of A4. In this embodiment, the number of original documents is calculated on the basis of the aggregation setting. However, if the number of original documents is directly obtained already, an integrated value of the number of original documents may be used. An aggregated value ($a_{Nin1}$) is acquired from the aggregation setting of the log information. For example, in the case of 1-in-1 for not performing aggregation, the aggregated value ($a_{Nin1}$) is "1". In the case of 2-in-1 for aggregating two surfaces into one surface, the aggregated value ($a_{Nin1}$) is "2". The number of original documents (y3) is a sum of values obtained by multiplying a product of the aggregated value ($a_{Nin1}$) and the A4 conversion coefficient ($A_{size}$) with the number of printed surfaces (x2) per one job. The number of original documents (y3) is calculated as $y3=\Sigma(A_{size} \times a_{Nin1} \times x2)$ (Act 104).

The number of reduced sheets by aggregation ($z_{Nin1}$) is a value obtained by subtracting the number of printed surfaces per one job from the number of original documents per one job. Therefore, the number of reduced sheets by aggregation ($z_{Nin1}$) is calculated as $z_{Nin1}=\Sigma(A_{size} \times (a_{Nin1}-1) \times x2)$. A reduction ratio by aggregation (N-in-1) ($r_{Nin1}$) is a value obtained by dividing the number of reduced sheets by aggregation ($z_{Nin1}$) by the number of original documents (y3). Therefore, the reduction ratio by aggregation ($r_{Nin1}$) can be calculated as $r_{Nin1}=z_{Nin1} \div y3$ (Act 105).

The duplex-reduction calculating unit 24 calculates a sheet reduction ratio. The sheet reduction ratio indicates a ratio of the number of sheets reduced by duplex printing setting and aggregation printing setting. Specifically, a sheet reduction ratio ($r_{print}$) is a value obtained by dividing, by the number of original documents (y3), a value obtained by adding up the number of reduced sheets by duplex ($z_{duplex}$) and the number of reduced sheets by aggregation ($z_{Nin1}$). The sheet reduction ratio ($r_{print}$) can be calculated as $r_{print}=z_{duplex}+z_{Nin1} \div y3$ (Act 106).

The duplex-reduction calculating unit 24 calculates a CO2 emission reduction amount. The CO2 emission reduction amount is calculated by converting a value of CO2 that can be saved by reduced sheets. When a CO2 emission per one sheet is represented as $A_{co2}$, a value obtained by multiplying, with $A_{co2}$, a value obtained by adding up the number of reduced sheets by duplex ($z_{duplex}$) and the number of reduced sheets by aggregation ($z_{Nin1}$) is a CO2 emission reduction amount ($c_{print}$). The CO2 emission reduction amount ($c_{print}$) can be calculated as $c_{print}=(z_{duplex}+z_{Nin1})\times A_{co2}$ (Act 107). As the CO2 emission ($A_{co2}$) per one sheet, for example, a value of 6 g is known.

Figure 8:
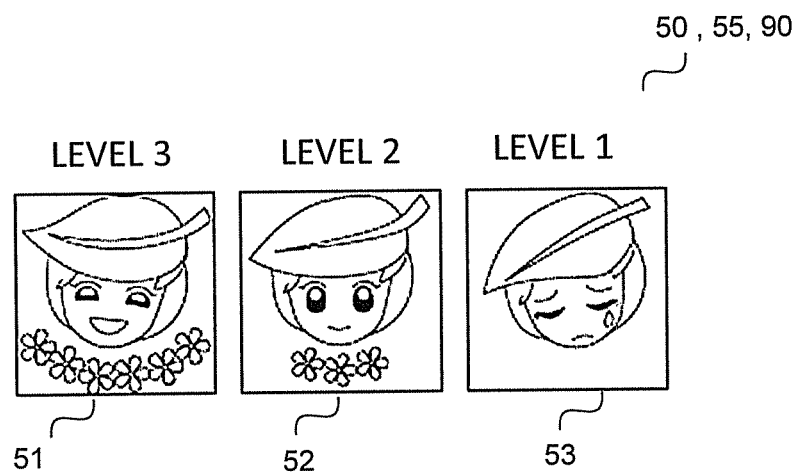
FIG. 8 is a diagram of characters displayed on the ecological report according to the first embodiment.

FIG. 8 is a diagram of characters displayed on the ecological report according to this embodiment. The part of the character 50 in the printing state area 41 of the ecological report 40 is formed in a shape of a face. The character 50 changes in three stages according to a sheet reduction ratio. The part of the character 55 in the reuse state area 42 of the ecological report 40 is formed in a shape of a face. The character 55 changes in three stages according to a sheet reuse ratio. As a character, any one of a high level 3 (51), an intermediate level 2 (52), and a low level 1 (53) is selected according to a degree of a reduction ratio or a reuse ratio explained below. The expression of the face of the character is changed according to the level of the reduction ratio or the reuse ratio. At the level 3 (51), a smile face is displayed. At the level 2 (52), a normal face is displayed. At the level 1 (53), a sad face is displayed. The user can visually recognize states of a reduction level and a reuse level of printed sheets of the user according to the expression of the character.

Figure 9:
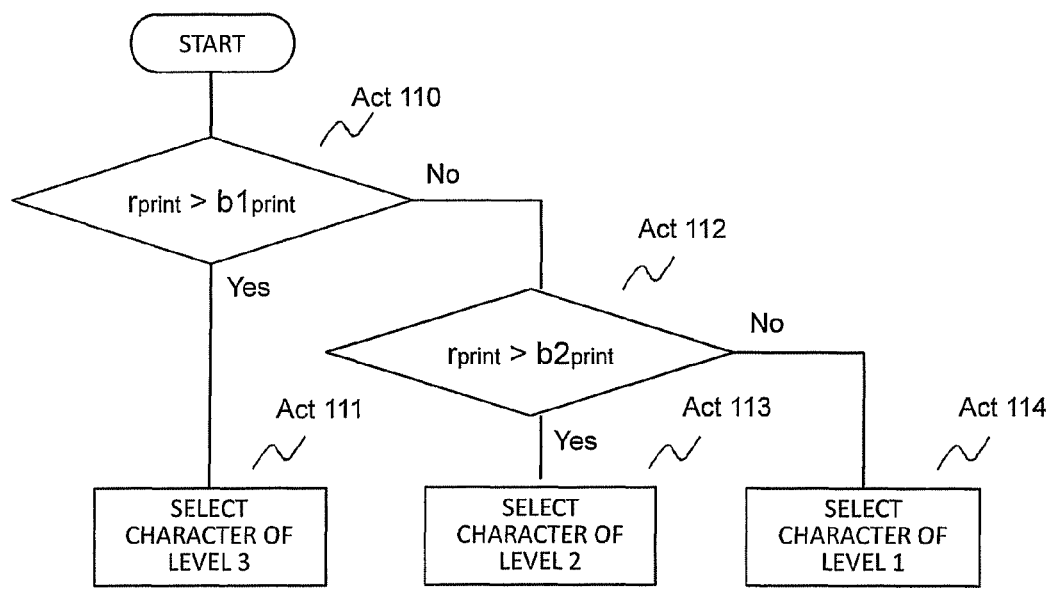
FIG. 9 is a flowchart for explaining processing for selecting a printing state character according to the first embodiment.

FIG. 9 is a flowchart for explaining processing for selecting a printing state character according to this embodiment.

The printing-state-character selecting unit 26 determines, on the basis of thresholds $b1_{print}$ and $b2_{print}$ ($b1_{print}>b2_{print}$) in two stages determined in advance, whether the sheet reduction ratio ($r_{print}$) is larger than the thresholds and determines a character. The thresholds may be able to be set for each user or may be determined by multiplying an overall average with a coefficient.

First, the printing-state-character selecting unit 26 determines whether the sheet reduction ratio ($r_{print}$) is larger than the threshold 1 ($b1_{print}$) (Act 110). If the sheet reduction ratio ($r_{print}$) is larger than the threshold 1 ($b1_{print}$) (Yes in Act 110), the printing-state-character selecting unit 26 selects the character of the level 3 shown in FIG. 8 (Act 111). If the sheet reduction ratio ($r_{print}$) is not larger than the threshold 1 ($b1_{print}$) (No in Act 110), the printing-state-character selecting unit 26 determines whether the sheet reduction ratio ($r_{print}$) is larger than the threshold 2 ($b2_{print}$) (Act 112). If the sheet reduction ratio ($r_{print}$) is larger than the threshold 2 ($b2_{print}$) (Yes in Act 112), the printing-state-character selecting unit 26 selects the character of the level 2 shown in FIG. 8 (Act 113). On the other hand, if the sheet reduction ratio ($r_{print}$) is not larger than the threshold 2 ($b2_{print}$) (No in Act 112), the printing-state-character selecting unit 26 selects the character of the level 1 shown in FIG. 8 (Act 114).

Figure 10:
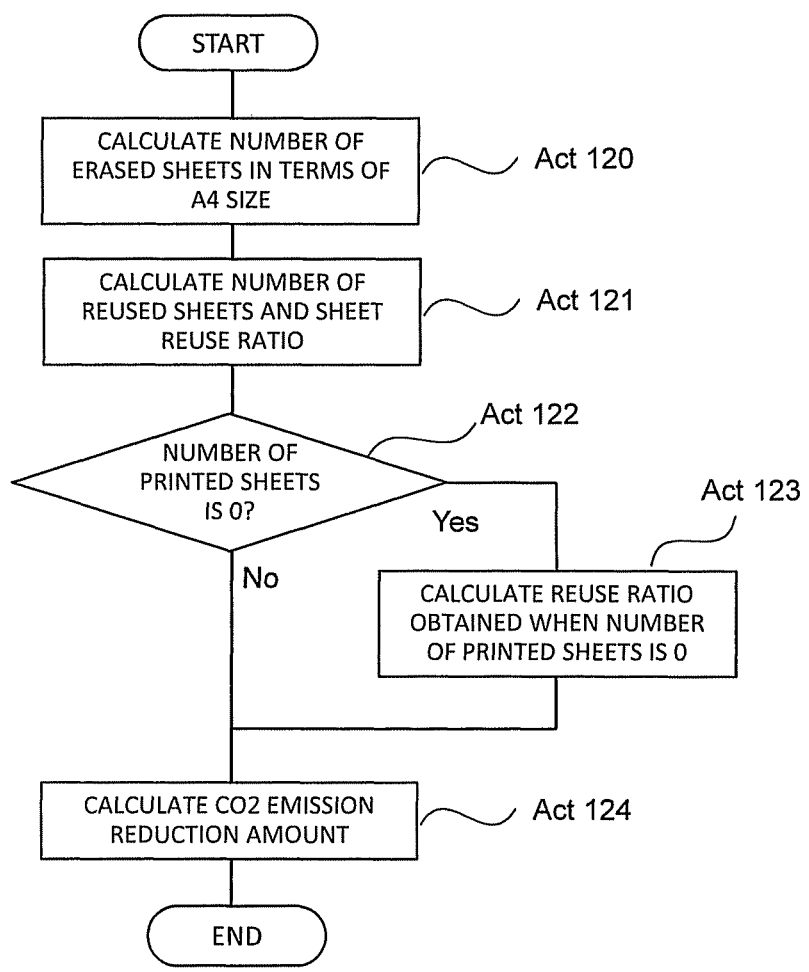
FIG. 10 is a flowchart for explaining processing for calculating a reuse ratio of sheets according to the first embodiment.

FIG. 10 is a flowchart for explaining processing for calculating a sheet reuse ratio according to the first embodiment.

A section of the number of reused sheets of the erasing log indicates, in terms of A4, the number of sheets, erasing of printed surfaces of which is successful in the erasing apparatus. The sheet-reuse-ratio calculating unit 27 acquires a sheet size from the size information of the erasing log and acquires the A4 conversion coefficient ($A_{size}$) corresponding to the sheet size from the A4 conversion table shown in FIG. 4. When the number of reused sheets per one job is represented as (x4), a sum ($z_{reuse}$) of the numbers of reused sheets is calculated as $z_{reuse}=\Sigma(A_{size}\times x4)$ (Act 120).

The sheet-reuse-ratio calculating unit 27 calculates a sheet reuse ratio. The sheet reuse ratio indicates a ratio of sheets that can be reused with respect to the number of printed sheets. A reuse ratio ($r_{reuse}$) is a value obtained by dividing the number of reused sheets ($z_{reuse}$) by the number of printed sheets (y1). The reuse ratio ($r_{reuse}$) can be calculated by Expression $r_{reuse}=z_{reuse}\div y1$ (Act 121).

Figure 11:
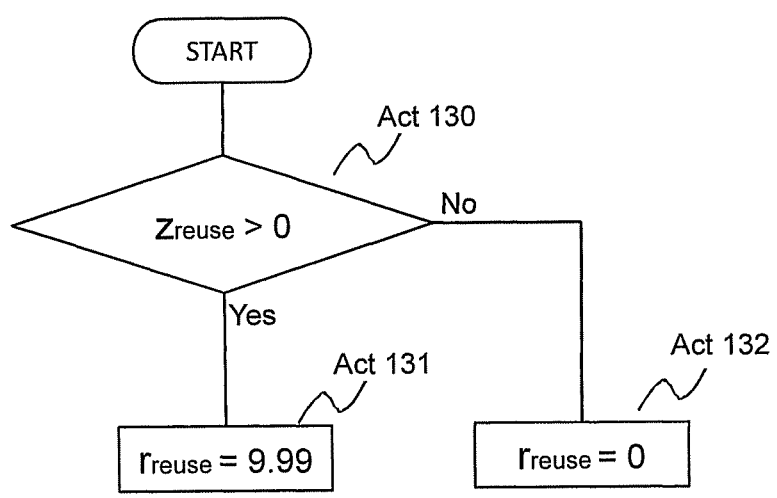
FIG. 11 is a flowchart for explaining processing for calculating a reuse ratio of sheets according to the first embodiment when the number of printed sheets is zero.

The sheet-reuse-ratio calculating unit 27 determines whether the number of printed sheets (y1) is 0 (Act 122). If the number of printed sheets is 0 (Yes in Act 122), the sheet-reuse-ratio calculating unit 27 calculates a reuse ratio obtained when the number of printed sheets is 0 (Act 123). A flowchart for explaining processing for calculating the reuse ratio ($r_{reuse}$) if the number of printed sheets (y1) is 0 (Yes in Act 122) is shown in FIG. 11.

The sheet-reuse-ratio calculating unit 27 determines whether the number of reused sheets ($z_{reuse}$) is larger than 0 (Act 130). If the number of reused sheets ($z_{reuse}$) is larger than 0 (Yes in Act 130), the sheet-reuse-ratio calculating unit 27 sets the reuse ratio ($r_{reuse}$) to 999% (Act 131). 999% is an example. The reuse ratio ($r_{reuse}$) is not limited to this and other ratios may be displayed. On the other hand, if the number of reused sheets ($z_{reuse}$) is 0 (No in Act 130), the sheet-reuse-ratio calculating unit 27 sets the reuse ratio ($r_{reuse}$) to 0% (Act 132).

On the other hand, if the number of printed sheets is not 0 (No in Act 122), the sheet-reuse-ratio calculating unit 27 calculates a CO2 emission reduction amount (Act 124). The CO2 emission reduction amount indicates CO2 that can be saved by reusable sheets. When a CO2 emission per one sheet is represented as ($A_{CO2}$), a CO2 emission reduction amount ($c_{reuse}$) is a value obtained by multiplying the number of reused sheets ($z_{reuse}$) with ($A_{CO2}$). The CO2 emission reduction amount ($c_{reuse}$) can be calculated as $c_{reuse}=z_{reuse}\times A_{co2}$.

Figure 12:
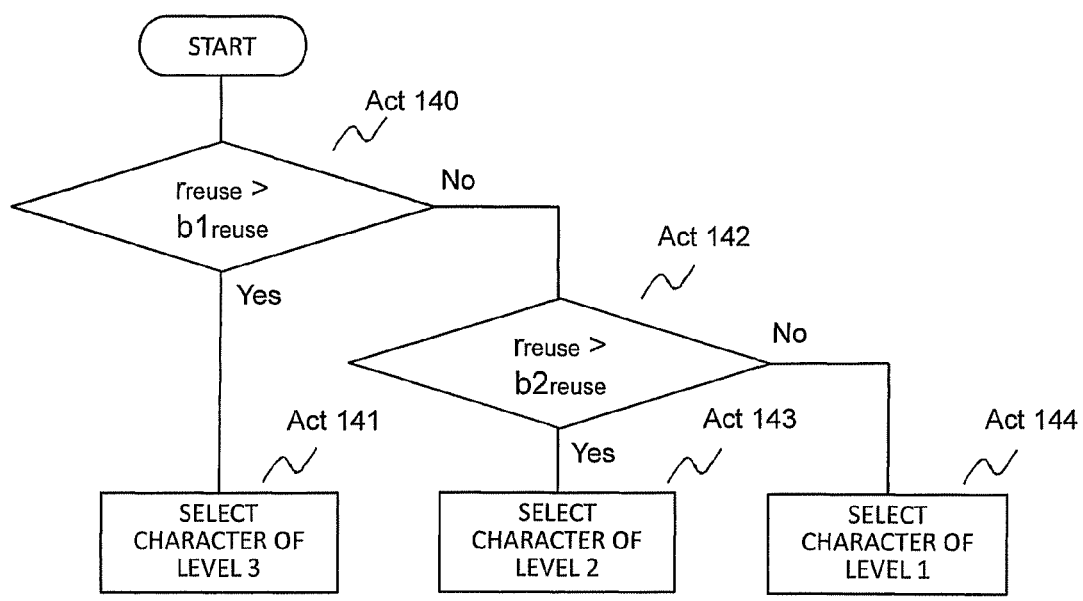
FIG. 12 is a flowchart for explaining processing for selecting a reuse state character according to the first embodiment.

FIG. 12 is a flowchart for explaining processing for selecting a reuse state character according to this embodiment.

The reuse-state-character selecting unit 28 determines, on the basis of thresholds $b1_{reuse}$ and $b2_{reuse}$ ($b1_{reuse}>b2_{reuse}$) in two stages determined in advance, whether the sheet reuse ratio ($r_{reuse}$) is larger than the thresholds and determines a character. The thresholds may be set for each user or may be determined by multiplying an overall average with a coefficient.

First, the reuse-state-character selecting unit 28 determines whether the sheet reuse ratio ($r_{reuse}$) is larger than the threshold 1 ($b1_{reuse}$) (Act 140). If the sheet reuse ratio ($r_{reuse}$) is larger than the threshold 1 ($b1_{reuse}$) (Yes in Act 140), the reuse-state-character selecting unit 28 selects the character of the level 3 shown in FIG. 8 (Act 141). If the sheet reuse ratio ($r_{reuse}$) is not larger than the threshold 1 ($b1_{reuse}$) (No in Act 140), the reuse-state-character selecting unit 28 determines whether the sheet reuse ratio ($r_{reuse}$) is larger than the threshold 2 ($b2_{reuse}$) (Act 142). If the sheet reuse ratio ($r_{reuse}$) is larger than the threshold 2 ($b2_{reuse}$) (Yes in Act 142), the reuse-state-character selecting unit 28 selects the character of the level 2 shown in FIG. 8 (Act 143). If the sheet reuse ratio ($r_{reuse}$) is not larger than the threshold 2 ($b2_{reuse}$) (No in Act 142), the reuse-state-character selecting unit 28 selects the character of the level 1 shown in FIG. 8 (Act 144).

A method of calculating a CO2 emission reduction amount of this month in the CO2 emission reduction amount display area 43 displayed near the center of the ecological report shown in FIG. 6 is explained.

The CO2-emission-reduction-amount calculating unit 29 calculates an overall CO2 emission reduction amount. A CO2 emission reduction amount (c) can be calculated as a sum of a CO2 emission reduction amount by printing ($c_{print}$) and a CO2 emission reduction amount by reuse ($c_{reuse}$) i.e., can be calculated by Expression $c=c_{print}+c_{reuse}$.

Ranking displayed in the rank display area 44 in a lower part of the ecological report shown in FIG. 6 is explained. The ranking and rank determining unit 31 determines ranking on the basis of a total score ($s_{total}$). The total score ($s_{total}$) is calculated from a value obtained by dividing, by the number of original documents (y3), a value obtained by adding up the number of reduced sheets by duplex ($z_{duplex}$), the number of reduced sheets by aggregation ($z_{Nin1}$), and the number of reused sheets ($z_{reuse}$). In other words, the total score ($s_{total}$) can be calculated by Expression $s_{total}=(z_{duplex}+z_{Nin1}+z_{reuse})\div y3$. The ranking and rank determining unit 31 determines ranking in order from a user having a highest total score.

Figure 13:
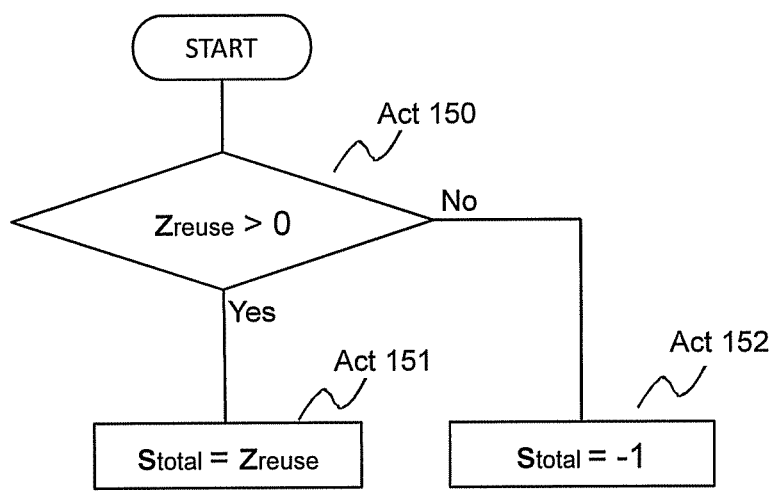
FIG. 13 is a flowchart for explaining processing for calculating a total score according to the first embodiment.

A flowchart for explaining processing for calculating the total score ($s_{total}$) when the number of printed sheets (y1) is 0 is shown in FIG. 13. The ranking and rank determining unit 31 determines whether the number of reused sheets ($z_{reuse}$) is larger than 0 (Act 150). If the number of reused sheets ($z_{reuse}$) is larger than 0 (Yes in Act 150), the ranking and rank determining unit 31 substitutes the number of reused sheets ($z_{reuse}$) in the total score ($s_{total}$) (Act 151). If the number of reused sheets ($z_{reuse}$) is 0 (No in Act 150), the ranking and rank determining unit 31 sets the total score ($s_{total}$) to "−1" and sets ranking as out of rank (Act 152).

Figure 14:
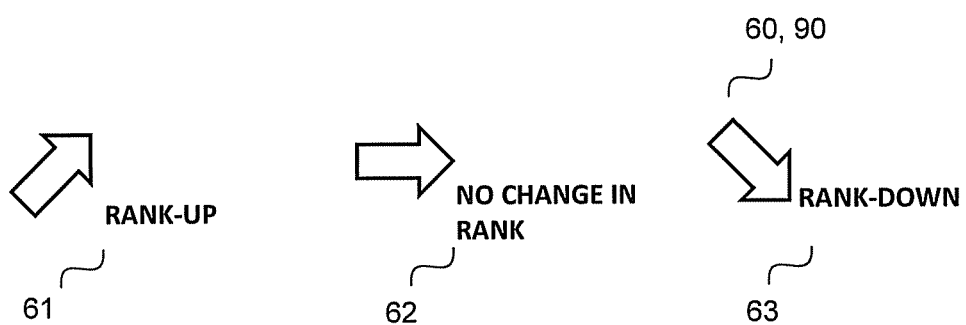
FIG. 14 is a diagram of rank states displayed on an ecological report according to the first embodiment.

FIG. 14 is a diagram of rank states displayed on the ecological report. The rank states are displayed in three stages, "rank-up", "no change in rank", and "rank-down". If the ranking calculated by the ranking and rank determining unit 31 is up from the last ranking, "rank-up" is displayed. If the ranking is the same as the last ranking, "no change in rank" is displayed. If the ranking is down from the last ranking, "rank-down" is displayed. In order to display the rank states, it is necessary to store the last ranking. Ranking is calculated every time a user logs in to the system and written in a not-shown data table. Ranking may be periodically saved in the table at a fixed period.

A method of selecting an advice displayed in an advice section displayed in a lower part of the ecological report shown in FIG. 6 is explained.

Figure 15:
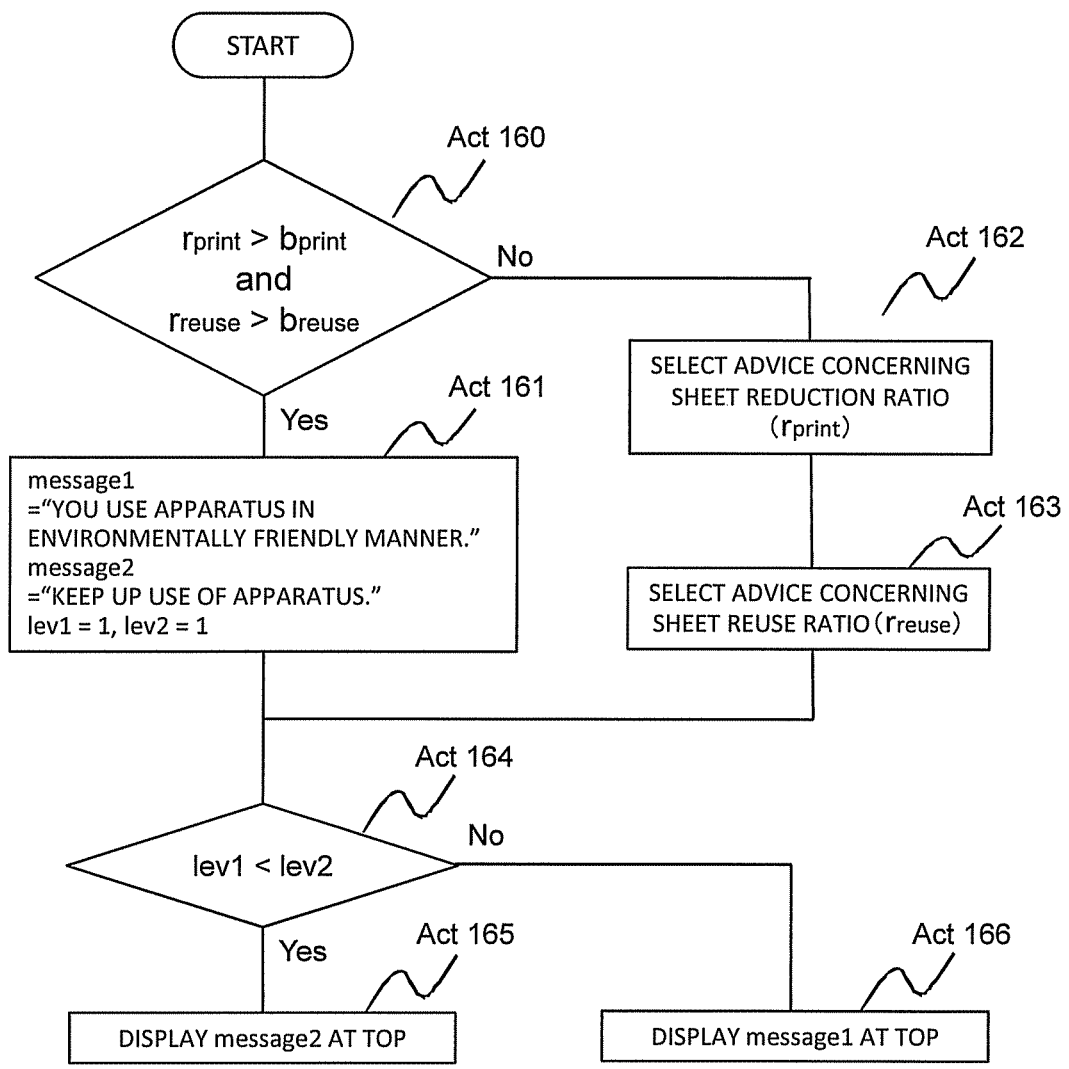
FIG. 15 is a flowchart for explaining processing for selecting an advice according to the first embodiment.
Figure 16:
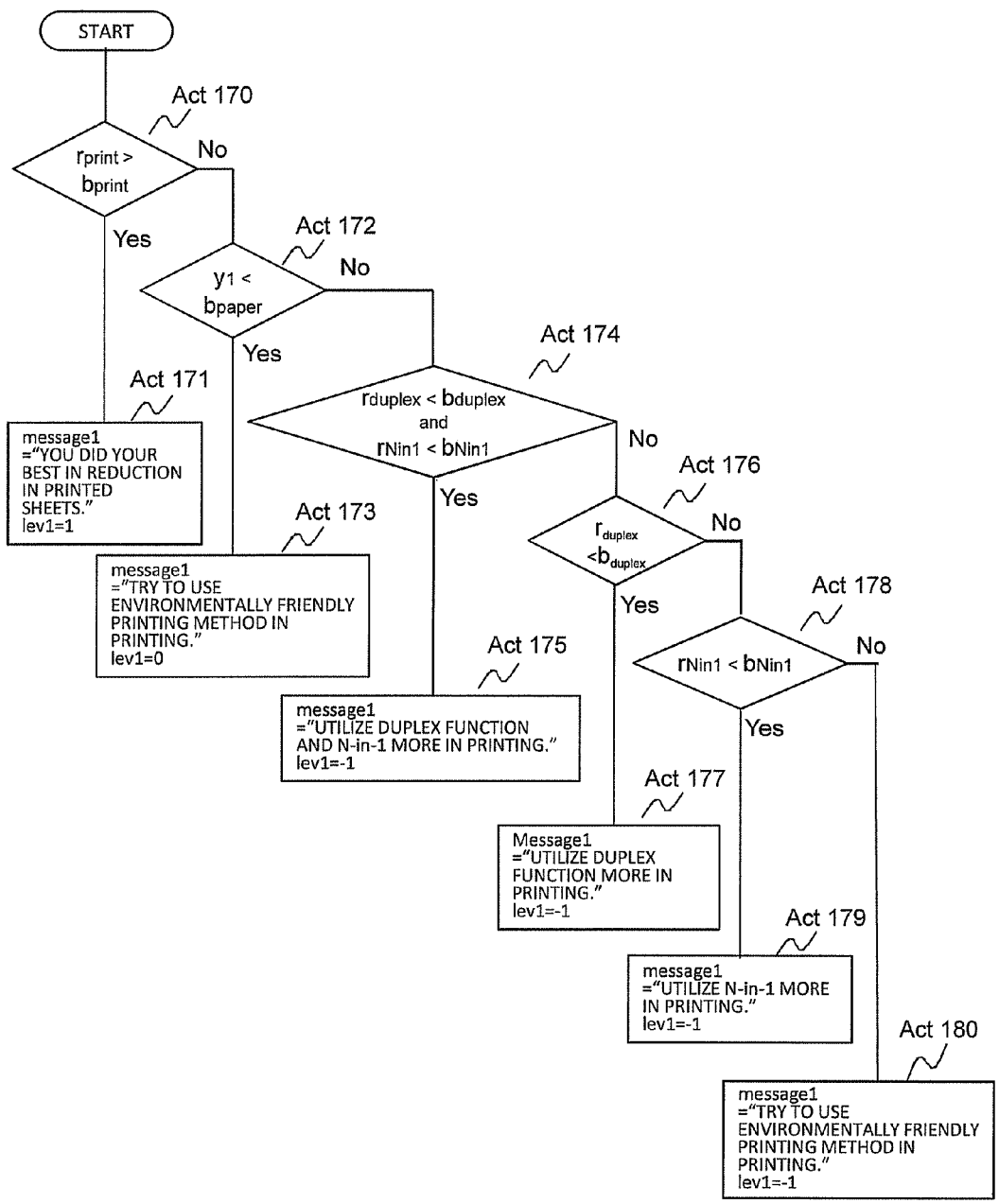
FIG. 16 is a flowchart for explaining processing for selecting an advice concerning a reduction ratio of sheets according to the first embodiment.
Figure 17:
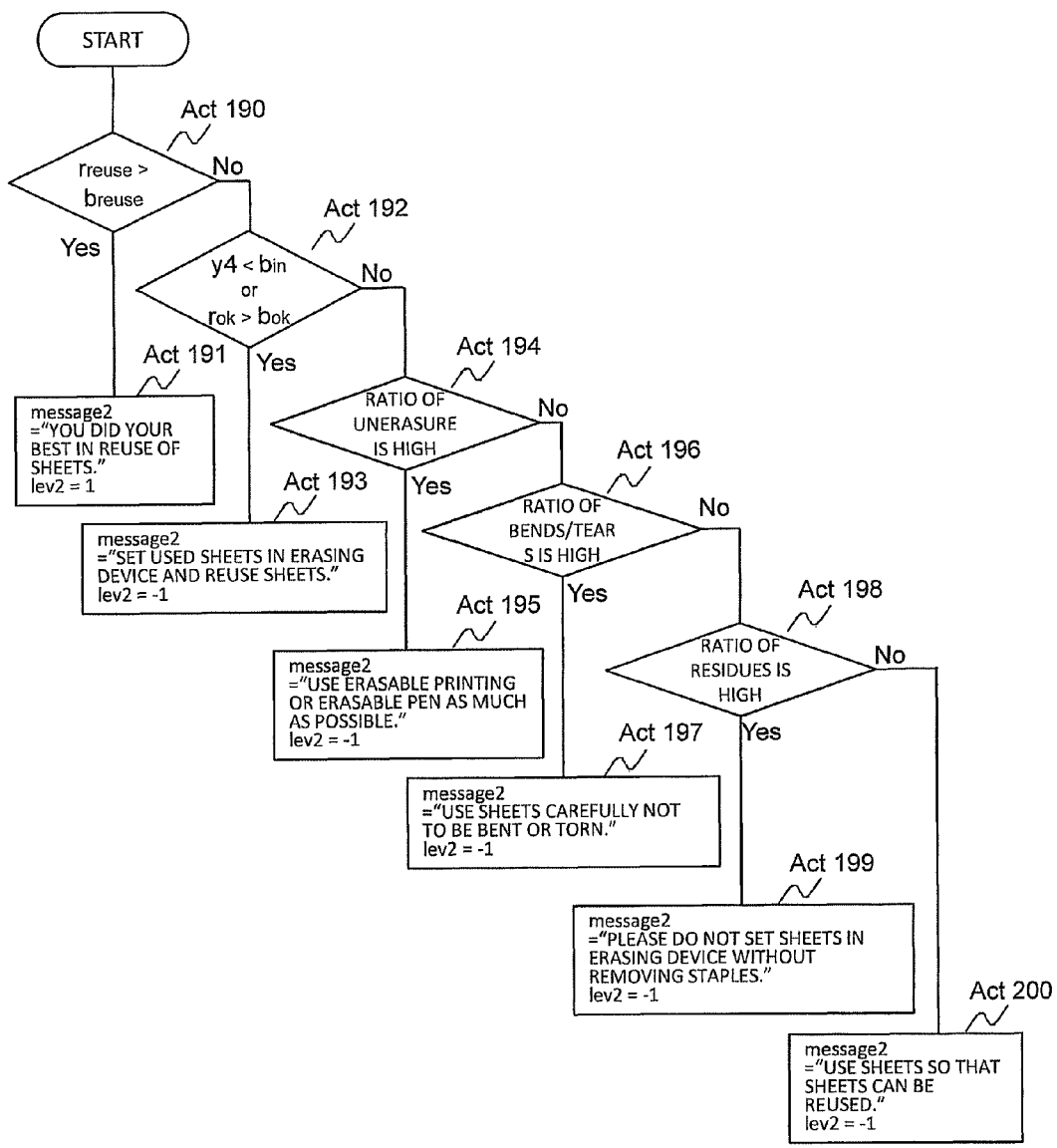
FIG. 17 is a flowchart for explaining processing for selecting an advice concerning a reuse ratio of sheets according to the first embodiment.

FIGS. 15 to 17 are flowcharts for explaining processing for selecting an advice. Thresholds used for determination of advice selection include a threshold ($b_{print}$) of a sheet reduction ratio, a threshold ($b_{duplex}$) of a reduction ratio by duplex, a threshold ($b_{Nin1}$) of a reduction ratio by aggregation, a threshold ($b_{paper}$) of the number of printed sheets, a threshold ($b_{reuse}$) of a sheet reuse ratio, a threshold ($b_{in}$) of the number of sheets set in the erasing device, and a threshold ($b_{ok}$) of a sheet erasing success ratio. As the thresholds, thresholds determined in advance may be used. The thresholds may be able to be set for each user or the like. Further, the thresholds may be set by multiplying an overall average with a coefficient.

FIG. 15 is a flowchart for explaining processing for selecting an advice according to this embodiment. First, the advice setting unit 32 determines whether the sheet reduction ratio ($r_{print}$) is larger than the threshold ($b_{print}$) and the sheet reuse ratio ($r_{reuse}$) is larger than the threshold ($b_{reuse}$) (Act 160). If both of the sheet reduction ratio ($r_{print}$) and the sheet reuse ratio ($r_{reuse}$) are larger than the thresholds (Yes in Act 160), the advice setting unit 32 substitutes an advice "you use the apparatus in an environmentally friendly manner." in a message message1 concerning reduction of sheets and substitutes an advice "keep up the use of the apparatus." in a message message2 concerning reuse of sheets. The advice setting unit 32 sets "1" in a sheet reduction flag lev1 and a sheet reuse flag lev2 (Act 161). If both of the sheet reduction ratio ($r_{print}$) and the sheet reuse ratio ($r_{reuse}$) are not larger than the thresholds (No in Act 160), the advice setting unit 32 selects an advice concerning the sheet reduction ratio ($r_{print}$) (Act 162) and subsequently selects an advice concerning the sheet reuse ratio ($r_{reuse}$) (Act 163). The advice setting unit 32 determines whether lev2 is larger than lev1 (Act 164). If lev2 is larger than lev1 (Yes in Act 164), the advice setting unit 32 displays message1 after displaying message2 at the top of an advice display section shown in FIG. 6 (Act 165). On the other hand, if lev2 is not larger than lev1 (No in Act 164), the advice setting unit 32 displays message2 after displaying message1 at the top of the advice display section shown in FIG. 6 (Act 166). In the sheet reduction flag lev1 and the sheet reuse flag lev2, "1", "0", and "−1" are set for messages in order from a message with best content. This is for displaying a praising advice at the top.

FIG. 16 is a flowchart for explaining processing for selecting an advice concerning a sheet reduction ratio according to the first embodiment. First, the sheet-reduction-message selecting unit 33 determines whether the reduction ratio ($r_{print}$) is larger than the threshold ($b_{print}$) (Act 170). If the reduction ratio ($r_{print}$) is larger than the threshold ($b_{print}$) (Yes in Act 170), the sheet-reduction-message selecting unit 33 substitutes an advice "you did your best in reduction of printed sheets." in message1 and sets "1" in the flag lev1 (Act 171). If the reduction ratio ($r_{print}$) is not larger than the threshold ($b_{print}$) (No in Act 170), the sheet-reduction-message selecting unit 33 determines whether the number of printed sheets (y1) is smaller than the threshold ($b_{paper}$)) Act 172). If the number of printed sheets (y1) is smaller than the threshold ($b_{paper}$) (Yes in Act 172), the advice setting unit substitutes an advice "try to use an environmentally friendly printing method in printing." in message1 and sets "0" in the flag lev1 (Act 173). If the number of printed sheets (y1) is not smaller than the threshold ($b_{paper}$) (No in Act 172), the sheet-reduction-message selecting unit 33 determines whether both of the reduction ratio by duplex ($r_{duplex}$) and the reduction ratio by aggregation ($r_{Nin1}$) are respectively smaller than the threshold ($b_{duplex}$) and the threshold ($b_{Nin1}$) (Act 174). If both of the reduction ratio by duplex ($r_{duplex}$) and the reduction ratio by aggregation ($r_{Nin1}$) are smaller than the thresholds (Yes in Act 174), the sheet-reduction-message selecting unit 33 substitutes an advice "utilize the duplex function and the N-in-1 function more in printing." in message1 and sets "−1" in lev1 (Act 175). If at least one of the reduction ratio by duplex ($r_{duplex}$) and the reduction ratio by aggregation ($r_{Nin1}$) is larger than the threshold (No in Act 174), the sheet-reduction-message selecting unit 33 determines whether the reduction ratio by duplex ($r_{duplex}$) is smaller than the threshold ($b_{duplex}$) (Act 176). If the reduction ratio by duplex ($r_{duplex}$) is smaller than the threshold ($b_{duplex}$) (Yes in Act 176), the sheet-reduction-message selecting unit 33 substitutes an advice "utilize the duplex function more in printing." in message1 and sets "−1" in the flag lev1 (Act 177). If the reduction ratio by duplex ($r_{duplex}$) is not smaller than the threshold ($b_{duplex}$) (No in Act 176), the sheet-reduction-message selecting unit 33 determines whether the reduction ratio by aggregation ($r_{Nin1}$) is smaller than the threshold ($b_{Nin1}$) (Act 178). If the reduction ratio by aggregation ($r_{Nin1}$) is smaller than the threshold ($b_{Nin1}$) (Yes in Act 178), the sheet-reduction-message selecting unit 33 substitutes an advice "utilize the aggregation function more in printing." in message1 and sets "−1" in the flag lev1 (Act 179). If the reduction ratio by aggregation ($r_{Nin1}$) is not smaller than the threshold ($b_{Nin1}$) (No in Act 178), the sheet-reduction-message selecting unit 33 substitutes an advice "try to use an environmentally friendly printing method in printing." in message1 and sets "−1" in the flag lev1 (Act 180).

The number of sheets set in the, erasing device (y4) is explained. A sheet size is acquired from the size information of the erasing log and the A4 conversion coefficient ($A_{size}$)

corresponding to the target sheet size is acquired according to the A4 conversion table shown in FIG. 4. The number of set sheets (y4) is a sum of values obtained by multiplying, with the A4 conversion coefficient ($A_{size}$), a value obtained by adding up the number of reused sheets (x4) per one job and the number of discarded sheets (x5) per one job. The number of set sheets (y4) can be calculated by Equation y4=Σ((x4+x5)×$A_{size}$). A sheet erasing success ratio ($r_{ok}$) is a value obtained by dividing the number of reused sheets ($z_{reuse}$) by the number of sheets set in the erasing device (y4). The sheet erasing success ratio ($r_{ok}$) can be calculated by Expression $r_{ok}$=$z_{reuse}$÷y4.

FIG. 17 is a flowchart for explaining processing for selecting an advice concerning a sheet reuse ratio according to the first embodiment. First, the sheet-reuse-message selecting unit 34 determines whether the sheet reuse ratio ($r_{reuse}$) is larger than the threshold ($b_{reuse}$) (Act 190). If the sheet reuse ratio ($r_{reuse}$) is larger than the threshold ($b_{reuse}$) (Yes in Act 190), the sheet-reuse-message selecting unit 34 substitutes an advice "you did your best in reuse of sheets." in message2 and sets "1" in the flag lev2 (Act 191). If the sheet reuse ratio ($r_{reuse}$) is not larger than the threshold ($b_{reuse}$) (No in Act 190), the sheet-reuse-message selecting unit 34 determines whether the number of sheets set in the erasing apparatus (y4) is smaller than the threshold ($b_{in}$) or the sheet erasing success ratio ($r_{ok}$) is larger than the threshold ($b_{ok}$) (Act 192). If the number of sheets set in the erasing apparatus (y4) is smaller than the threshold ($b_{in}$) or the sheet erasing success ratio ($r_{ok}$) is larger than the threshold ($b_{ok}$) (Yes in Act 192), the sheet-reuse-message selecting unit 34 substitutes an advice "set used sheets in the erasing apparatus and reuse the sheets." in message2 and sets "−1" in the flag lev2 (Act 193). Otherwise (No in Act 192), the sheet-reuse-message selecting unit 34 determines whether a ratio of unerasure is the highest among discard factors (Act 194). If the ratio of unerasure is the highest (Yes in Act 194), the sheet-reuse-message selecting unit 34 substitutes an advice "use erasable printing or an erasable pen as much as possible." in message2 and sets "−1" in the flag lev2 (Act 195). Otherwise (No in Act 194), the sheet-reuse-message selecting unit 34 determines whether a ratio of bends or tears is the highest among the discard factors (Act 196). If the ratio of bends or tears is the highest (Yes in Act 196), the sheet-reuse-message selecting unit 34 substitutes an advice "use sheets carefully not to be bent or torn." in message2 and sets "−1" in the flag lev2 (Act 197). Otherwise (No in Act 196), the sheet-reuse-message selecting unit 34 determines whether a ratio of residues is the highest among the discard factors (Act 198). If the ratio of residues is the highest (Yes in Act 198), the sheet-reuse-message selecting unit 34 substitutes an advice "please do not set sheets in the erasing apparatus without removing staples." in message2 and sets "−1" in the flag lev2 (Act 199). Otherwise (No in Act 198), the sheet-reuse-message selecting unit 34 substitutes an advice "use sheets so that the sheets can be reused." in message2 and sets "−1" in the flag lev2 (Act 200). According to these kinds of processing, the advices are determined. The advices can be output to an advice display section shown in FIG. 6.

Consequently, the ecological-report creating unit 35 can calculate the display items of the screen on which a state of use by the user is displayed shown in FIG. 6. By adopting such a configuration, it is possible to display a printing state and a reuse state of the user in a combined form. In particular, the ranking and the advice can be comprehensively determined taking into account both analysis results of the printing state and the reuse state and a result of the determination can be shown. Therefore, even a person who can make an effort in only one of printing and reuse because of contents of a job or the like can reflect the effort on a result. Since a praising advice is displayed at the top in the advice display section, it is possible to increase a mood of the user for engaging in ecological activities, urge the user to adopt a more ecologically friendly method of use, and cause the user to maintain the motivation for environmental load reduction for a long period.

Second Embodiment

A second embodiment is a modification of the first embodiment. Components including functions same as those in the first embodiment are denoted by the same reference numerals and signs and explanation of the components is omitted.

Figure 18:
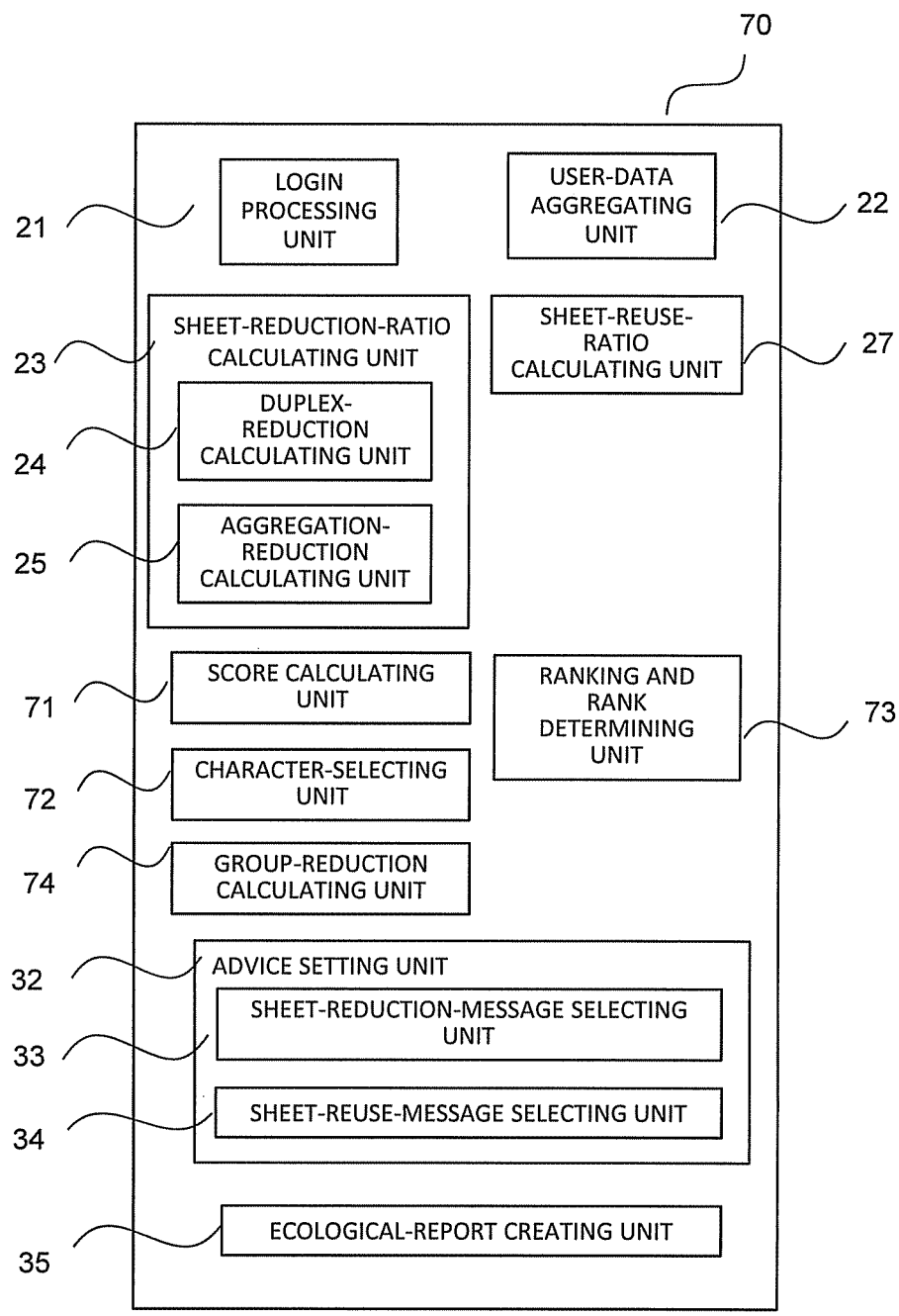
FIG. 18 is a functional block diagram of an environmental contribution supporting system according to a second embodiment.

FIG. 18 is a functional block diagram of a printing environmental load reduction supporting system according to a second embodiment. An ecological report in the second embodiment presents, in addition to a state of use by a user, a state of use by a group to which the user belongs. The group may be a department, an office, a company, or the like.

The login processing unit 21, the user-data aggregating unit 22, the sheet-reduction-ratio calculating unit 23, the duplex-reduction calculating unit 24, the aggregation-reduction calculating unit 25, and the sheet-reuse-ratio calculating unit 27 are the same as those in the first embodiment. Therefore, explanation of these units is omitted. A score calculating unit 71 represents the number of saved sheets as a score of a degree of ecology with 100 points set as an upper limit.

A character selecting unit 72 selects one of characters indicating saving states in three stages explained below from a score calculated by the score calculating unit 71. A ranking and rank determining unit 73 calculates ranking from a total score calculated by the score calculating unit 71 and represents, as a character explained below, whether the present ranking is up from the last ranking, the same as the last ranking, or down from the last ranking. A group-reduction calculating unit 74 calculates the number of saved sheets of all users belonging to the group.

The advice setting unit 32 includes the sheet-reduction-message selecting unit 33 and the sheet-reuse-message selecting unit 34. The sheet-reduction-message selecting unit 33 selects an advice concerning sheet reduction. The sheet-reuse-message selecting unit 34 selects an advice concerning sheet reuse.

The ecological-report creating unit 35 arranges, as one report, reduction data and characters for a login user and a group to which the user belongs and creates an ecological report explained below.

Figure 19:
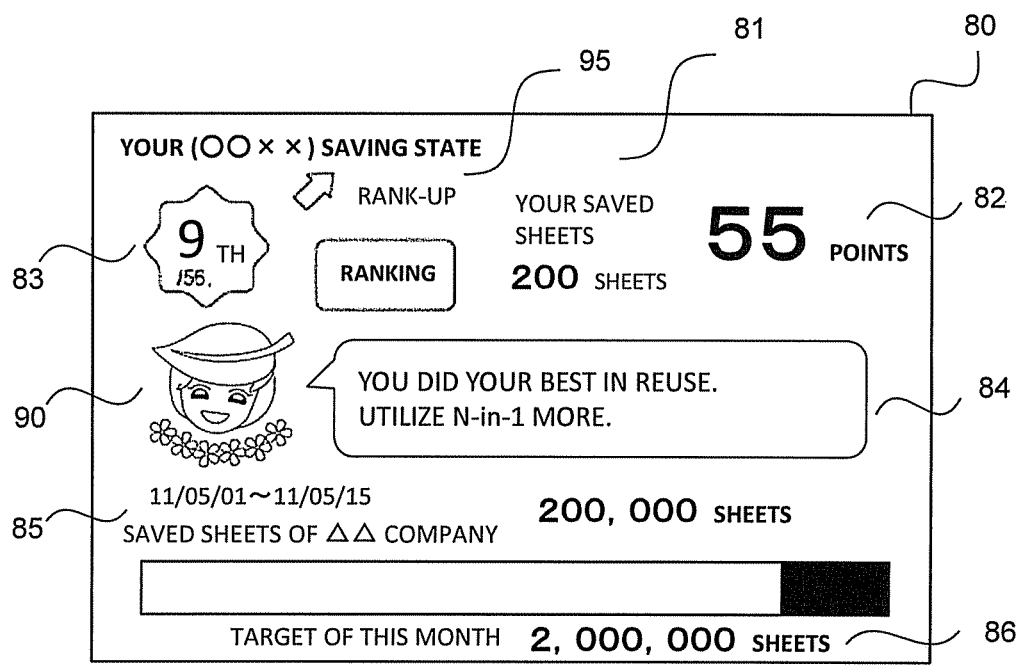
FIG. 19 is a display example of an ecological report according to the second embodiment.

FIG. 19 is a display example of an ecological report according to the second embodiment. An ecological report 80 includes a number of saved sheets display area 81 in which a saving state (the number of saved sheets explained below) for a predetermined period of a login user is displayed, a score area 82 in which a score calculated by the score calculating unit 71 is displayed, a ranking display area 83 in which ranking calculated on the basis of the score is displayed, an advice display area 84 in which a comprehensive advice is provided concerning the present ecological state from a printing state and a reuse state, a group number of sheets display area 85 in which the number of saved sheets of an entire group to which the login user belongs is displayed, and a target display area 86 in which a target of this month set by an administrator in advance is displayed.

In the ecological report 80, a character 90 is displayed according to a saving state explained below (concerning contents of the character 90, see FIG. 8). In the ecological report 80, concerning the calculated ranking, a rank state character 95 indicating whether the present ranking is up from the last ranking, the same as the last ranking, or down from the last ranking is displayed (concerning contents of the rank state character 95, see FIG. 14).

Figure 20:
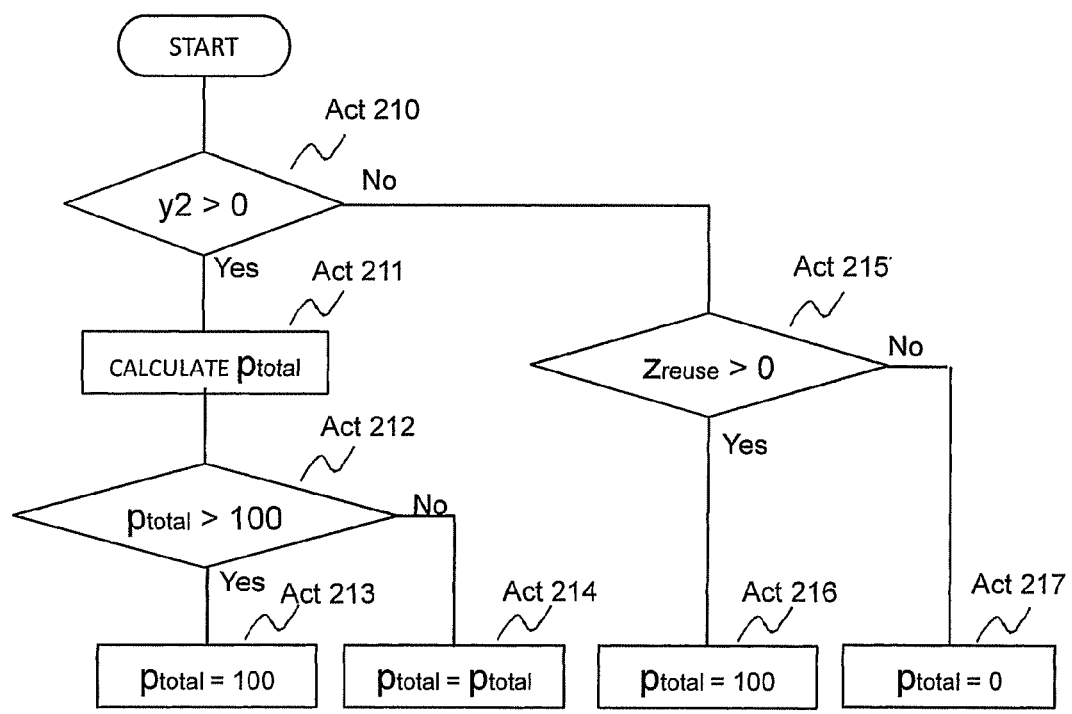
FIG. 20 is a flowchart for explaining processing for calculating a score according to the second embodiment.

FIG. 20 is a score calculation flowchart according to the second embodiment. A method of calculating a score displayed in the score area 82 of the ecological report 80 is explained.

First, the ecological-report creating unit 35 determines whether the number of printed surfaces (y2) is larger than 0 (Act 210). If the number of printed surfaces (y2) is larger than 0 (Yes in Act 210), the ecological-report creating unit 35 calculates a score ($p_{total}$) (Act 211). The score ($p_{total}$) is a value obtained by multiplying, with 100, a value obtained by dividing, by the number of printed surfaces (y2), a value obtained by adding up the number of reduced sheets by duplex ($z_{duplex}$) the number of reduced sheets by aggregation ($z_{Nin1}$) and the number of reused sheets ($a_{reuse}$) The score ($p_{total}$ can be calculated by Expression $p_{total}=(z_{duplex}+z_{Nin1}+z_{reuse})\div y2\times 100$.

The ecological-report creating unit 35 determines whether the score ($p_{total}$) is larger than 100 (Act 212). If the score ($p_{total}$) is larger than 100 (Yes in Act 212), the ecological-report creating unit 35 sets the score ($p_{total}$) to 100 points (Act 213). Otherwise (No in Act 212), the score ($p_{total}$) is a score calculated by Expression (Act 214). If the number of printed surfaces (y2) is equal to or smaller than 0 (No in Act 210), the ecological-report creating unit 35 determines whether the number of reused sheets ($z_{reuse}$) is larger than 0 (Act 215). If the number of reused sheets ($z_{reuse}$) is larger than 0 (Yes in Act 215), the ecological-report creating unit 35 sets the score ($p_{total}$) to 100 points (Act 216). Otherwise (No in Act 215), the ecological-report creating unit 35 sets the score ($p_{total}$) to 0 point (Act 217). In this case, the score ($p_{total}$) does not have to be 0 points and may be "–" indication or the like indicating impossibility of calculation.

Figure 21:
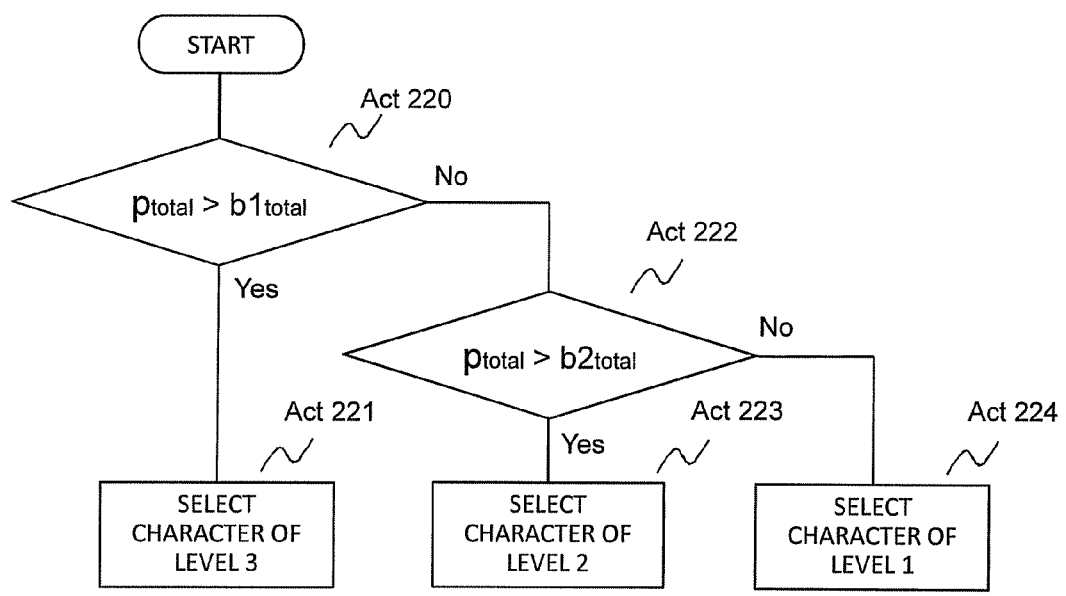
FIG. 21 is a flowchart for explaining processing for selecting a saving state character according to the second embodiment.

FIG. 21 is a flowchart for explaining processing for selecting a saving state character according to the second embodiment. The saving state character changes in three stages according to the score ($p_{total}$). The character selecting unit 72 determines a character from thresholds $b1_{total}$ and $b2_{total}$ ($b1_{total}>b2_{total}$) in two stages determined in advance and the calculated score ($p_{total}$). The threshold may be able to be set for each user or may be obtained by multiplying an overall average with a coefficient.

First, the character selecting unit 72 determines whether the score ($p_{total}$) is larger than the threshold 1 ($b1_{total}$) (Act 220). If the score ($p_{total}$) is larger than the threshold 1 ($b1_{total}$) (Yes in Act 220), the character selecting unit 72 displays the character of the level 3 shown in FIG. 8 (Act 221). If the score ($p_{total}$) is not larger than the threshold 1 ($b1_{total}$) (No in Act 220), the character selecting unit 72 determines whether the score ($p_{total}$) is larger than the threshold 2 ($b2_{total}$) (Act 222). If the score ($p_{total}$) is larger than the threshold 2 ($b2_{total}$) (Yes in Act 222), the character selecting unit 72 displays the character of the level 2 shown in FIG. 8 (Act 223). If the score ($p_{total}$) is not larger than the threshold 2 ($b2_{total}$) (No in Act 222), the character selecting unit 72 displays the character of the level 1 shown in FIG. 8 (Act 224).

A method of calculating the number of saved sheets of a group of the ecological report 80 is explained. The number of saved sheets of the group is calculated, using data extracted for the group, according to a calculation method same as the method of calculating the number of reduced sheets by duplex ($z_{duplex}$) the number of reduced sheets by aggregation ($z_{Nin1}$) and the number of reused sheets ($z_{reuse}$) calculated for the user. A sum of the number of reduced sheets ($w_{duplex}$), the number of reduced sheets by aggregation ($w_{Nin1}$), and the number of reused sheets ($w_{reuse}$) calculated for the group is the number of saved sheets ($w_{total}$) of the group. The number of saved sheets ($w_{total}$) of the group can be calculated by Expression $w_{total}=w_{duplex}+w_{Nin1}+w_{reuse}$.

A "target of this month" is a target value of the number of saved sheets attained by the group. This value is a value set by an administrator with a not-shown keyboard or a not-shown administrator PC connected via a network I/F.

By adopting such a configuration, as in the first embodiment, it is possible to display an ecological activity state in a form in which a sheet use state and a reuse state of the user are combined. An activity state of the user and an activity state of the group to which the user belongs are displayed on the same screen. Therefore, the user can not only grasp the present state of the user but also grasp a state of the entire group. Consequently, eco-consciousness can be further improved.

The present invention is not limited to the embodiments. For example, in the embodiments, the environmental contribution supporting apparatus includes the server. However, the environmental contribution supporting apparatus may be incorporated in an MFP or may be incorporated in an erasing apparatus. The character displayed on the ecological report may be a moving image.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An environmental contribution supporting apparatus provided for a system including a printing apparatus and an erasing apparatus that decolors an image formed on a recording medium with a decolorable coloring agent, the environmental contribution supporting apparatus comprising:
  a duplex-reduction calculating unit configured to calculate a sum of a number of reduced sheets by a duplex printing;
  an aggregation-reduction calculating unit configured to calculate a sum of a number of reduced sheets by an aggregation printing;
  a sheet-reduction-ratio calculating unit configured to calculate a sheet reduction ratio from the duplex-reduction calculating unit and the aggregation-reduction calculating unit;
  a printing-state-character selecting unit configured to select one character from a plurality of characters stored in a memory according to the sheet reduction ratio;
  a sheet-reuse-ratio calculating unit configured to calculate a sheet reuse ratio from a sum of a number of reused sheets decolored by the erasing apparatus;
  a reuse-state-character selecting unit configured to select one character from the plurality of characters stored in the memory according to the sheet reuse ratio;
  a sheet-reduction-message selecting unit configured to select a first message concerning sheet reduction on the basis of the sheet reduction ratio;
  a sheet-reuse-message selecting unit configured to select a second message concerning sheet reuse on the basis of the sheet reuse ratio;
  an advice setting unit configured to set order of presentation of the first message and the second message; and a report creating unit configured to edit the character selected by the printing-state-character selecting unit, the character selected by the reuse-state-character selecting unit, and the message set by the advice setting unit into a predetermined form.

2. The apparatus according to claim 1, wherein
the character selected by the printing-state-character selecting unit or the character selected by the reuse-state-character selecting unit is formed in a shape of a face, and
an expression of the face is changed according to a level of a reduction ratio or a reuse ratio.

3. The apparatus according to claim 1, further comprising:
a login processing unit configured to identify users logging in to the system; and
a ranking and rank determining unit configured to determine ranking in all the login users from a sum of the number of reduced sheets calculated by the duplex-reduction calculating unit, the number of reduced sheets calculated by the aggregation-reduction calculating unit, and the number of reduced sheets calculated by the sheet-reuse-ratio calculating unit.

4. The apparatus according to claim 3, wherein
the ranking and rank determining unit stores the determined ranking every time the login processing unit identifies the user and compares present ranking and last ranking of the user, and
the ranking and rank determining unit includes a character representing rank-up, no change in rank or rank-down.

5. The apparatus according to claim 1, wherein, as the order of presentation of the first message and the second message set by the advice setting unit, a praising message is presented first.

6. An environmental contribution supporting apparatus provided for a system including a printing apparatus and an erasing apparatus that decolors an image formed on a recording medium with a decolorable coloring agent, the environmental contribution supporting apparatus comprising:
a duplex-reduction calculating unit configured to calculate a sum of a number of reduced sheets by a duplex printing;
an aggregation-reduction calculating unit configured to calculate a sum of a number of reduced sheets by an aggregation printing;
a sheet-reduction-ratio calculating unit configured to calculate a sheet reduction ratio from the duplex-reduction calculating unit and the aggregation-reduction calculating unit;
a sheet-reuse-ratio calculating unit configured to calculate a sheet reuse ratio from a sum of a number of reused sheets decolored by the erasing apparatus;
a score calculating unit configured to calculate a score from a sum of the number of reduced sheets calculated by the duplex-reduction calculating unit and the aggregation-reduction calculating unit and the number of reused sheets calculated by the sheet-reuse-ratio calculating unit;
a character selecting unit configured to select one character from a plurality of characters stored in a memory according to the score calculated by the score calculating unit;
a sheet-reduction-message selecting unit configured to select a first message concerning sheet reduction on the basis of the sheet reduction ratio;
a sheet-reuse-message selecting unit configured to select a second message concerning sheet reuse on the basis of the sheet reuse ratio;
an advice setting unit configured to set order of presentation of the first message and the second message; and
a report creating unit configured to edit the character selected by the character selecting unit and the message set by the advice setting unit into a predetermined form.

7. The apparatus according to claim 6, further comprising:
a login processing unit configured to identify a user logging in to the system; and
a group-reduction calculating unit configured to calculate a number of saved sheets of a group to which the user belongs from a number of reduced sheets and a number of reused sheets for the group.

8. An environmental contribution supporting method provided for a system including a printing apparatus and an erasing apparatus that decolors an image formed on a recording medium with a decolorable coloring agent, the environmental contribution supporting method comprising:
calculating a sum of a number of reduced sheets by a duplex printing;
calculating a sum of a number of reduced sheets by an aggregation printing;
calculating a sheet reduction ratio from a sum of the number of reduced sheets by a duplex printing and the number of reduced sheets by an aggregation printing;
selecting one character from a plurality of characters stored in a memory according to the sheet reduction ratio;
calculating a sheet reuse ratio from a sum of a number of reused sheets decolored by the erasing apparatus;
selecting one character from the plurality of characters stored in the memory according to the sheet reuse ratio;
selecting a first message concerning sheet reduction on the basis of the sheet reduction ratio;
selecting a second message concerning sheet reuse on the basis of the sheet reuse ratio;
setting order of presentation of the first message and the second message; and
editing the selected printing state character, the selected reuse state character, and the set message into a predetermined form and creating a report.

9. The method according to claim 8, wherein
the character stored in the memory is formed in a shape of a face, and
an expression of the face is changed according to a level of the reduction ratio or the reuse ratio.

10. The method according to claim 8, further comprising:
identifying users logging in to the system; and
determining ranking in all the login users from a sum of a number of reduced sheets by duplex, a number of reduced sheets by aggregation, and a number of reduced sheets calculated by the sheet-reuse-ratio calculating unit.

11. The method according to claim 10, further comprising storing the determined ranking every time the login user is identified, comparing present ranking and last ranking of the user, and representing rank-up, no change in rank or rank-down as a character.

12. The method according to claim 8, wherein, as the set order of presentation of the first message and the second message, a praising message is presented first.

13. An environmental contribution supporting method provided for a system including a printing apparatus and an erasing apparatus that decolors an image formed on a recording medium with a decolorable coloring agent, the environmental contribution supporting method comprising:
calculating a sum of a number of reduced sheets by a duplex printing;

calculating a sum of a number of reduced sheets by an aggregation printing;

calculating a sheet reduction ratio from a sum of the number of reduced sheets by a duplex printing and the number of reduced sheets by an aggregation printing;

calculating a sheet reuse ratio from a sum of a number of reused sheets decolored by the erasing apparatus;

calculating a score from a sum of a number of reduced sheets calculated by the number of reduced sheets by a duplex printing and the number of reduced sheets by an aggregation printing and the number of reused sheets calculated by the sheet-reuse-ratio calculation;

selecting one character from a plurality of characters stored in a memory according to the calculated score;

selecting a first message concerning sheet reduction on the basis of the sheet reduction ratio;

selecting a second message concerning sheet reuse on the basis of the sheet reuse ratio;

setting order of presentation of the first message and the second message; and editing the selected character and the set message into a predetermined form and creating a report.

14. The method according to claim 13, further comprising:

identifying a user logging in to the system; and calculating a number of saved sheets of a group to which the user belongs from a number of reduced sheets and a number of reused sheets for the group.

* * * * *